May 20, 1924.
H. D'A. POWER
1,494,373
METHOD OF AND LENS FOR PHOTOGRAPHICALLY PRODUCING SOFT FOCUS EFFECTS
Filed Feb. 9, 1921
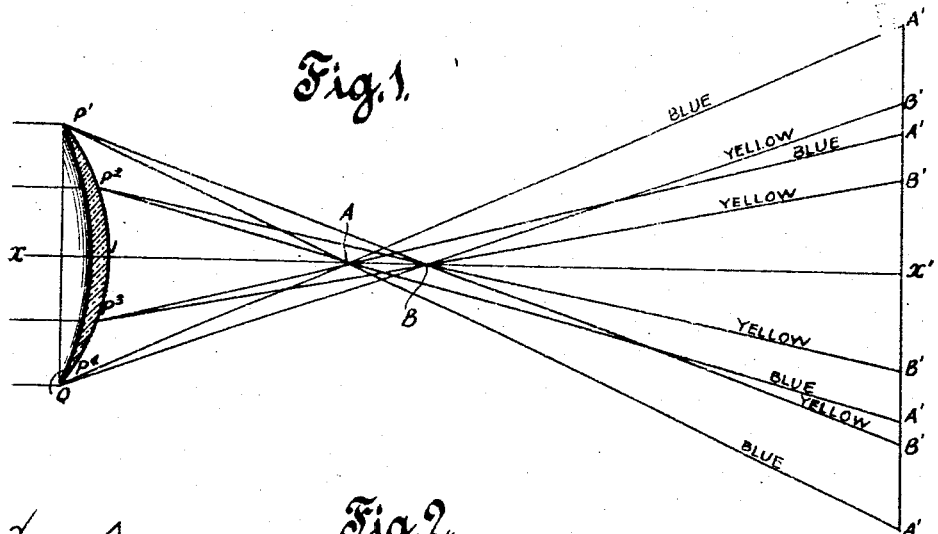
Fig. 1.
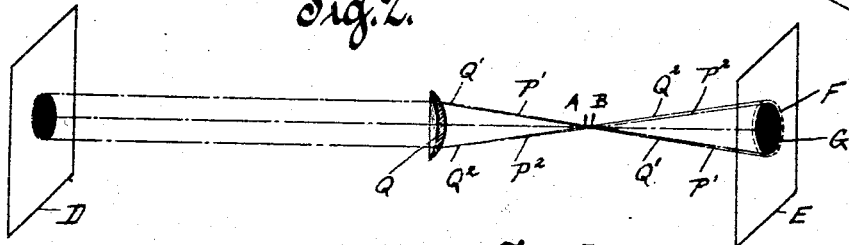
Fig. 2.
Fig. 3.
Fig. 4.
Fig. 5.
INVENTOR
Henry D'Arcy Power
BY Fredk C. Fischer
ATTORNEY Patented May 20, 1924.

1,494,373

UNITED STATES PATENT OFFICE.

HENRY D'ARCY POWER, OF SAN FRANCISCO, CALIFORNIA, ASSIGNOR TO HANOVIA CHEMICAL & MANUFACTURING COMPANY, OF NEWARK, NEW JERSEY, A CORPORATION OF NEW JERSEY.

METHOD OF AND LENS FOR PHOTOGRAPHICALLY PRODUCING SOFT-FOCUS EFFECTS.

Application filed February 9, 1921. Serial No. 443,528.

*To all whom it may concern:*

Be it known that I, HENRY D'ARCY POWER, a citizen of the United States, residing at San Francisco, in the county of San Francisco and State of California, have invented a certain new and useful Improvement in Methods of and Lenses for Photographically Producing Soft-Focus Effects, of which the following is a specification.

The invention is a method of photographically producing soft focus effects, and a means, namely, a lens of quartz, for carrying said method into practical effect.

In the accompanying drawings forming a part of this disclosure—

Figure 1 represents a quartz meniscus lens through which parallel rays of light are shown passing through the lens.

Figure 2 represents a quartz meniscus lens interposed in the path of light beam from the object to the sensitized surface.

Figure 3 represents an enlarged fragmentary view of the picture with the light shading around the margin thereof represented on the sensitized surface in Figure 2.

Figures 4 and 5 represent, respectively, the nature of this marginal diffusion, greatly enlarged, caused by a glass meniscus lens in Figure 4 and that by a quartz lens of meniscus form in Figure 5.

Referring to Figure 1, a quartz meniscus lens Q is represented, the axis of the lens being represented by the line X—X'. Parallel rays of light from the object are shown passing through the lens at the points $P^1$, $P^2$, $P^3$, and $P^4$ and brought to a focus at two points A and B, representing light rays of two wave lengths. The distance between A and B is much exaggerated for the sake of clarity and there would also be rays of a great variety of wave lengths brought to a focus at points intermediate between A and B. These have been omitted for the sake of clarity and the rays shown have been marked, respectively, blue and yellow; blue signifying rays of comparatively high actinic value, and yellow rays of comparatively low actinic value.

In Figure 2 is represented an object D as such brought to a focus on the sensitized surface E, showing a slight shade F around the margin of the picture G on the sensitized surface, due to the dispersion of the light. The dotted lines $P^1$—$P^1$ and $P^2$—$P^2$ representing the highly actinic rays of short wave lengths producing a defined marginated image, and the solid lines $Q^1$—$Q^1$ and $Q^2$—$Q^2$ representing the rays of low actinic value producing a graduated diffusion of the margin in the pictured image.

In Figure 3 is represented a fragmentary view of the main picture G and the light shading F around the margin of the picture considerably enlarged.

In Figures 4 and 5 is represented, respectively, the nature of this marginal diffusion, greatly enlarged, caused by a glass lens in Figure 4 of the meniscus form and that by a quartz lens in Figure 5 of meniscus form, both greatly magnified. Owing to the small width of the diffusion margin produced by it, it is possible by using a quartz lens of meniscus form to utilize and turn to good account for the betterment of the art a property which in glass lenses has chiefly been regarded as a disadvantage. It may also be observed that on account of this diffusion margin which amounts to nothing more than a shaded modeling of the otherwise harsh contour lines, a much better perspective is attained than with any other soft focus lens previously known.

I have discovered that a lens of quartz (synthetic or native crystal) ground preferably in meniscus form when used in a photographic camera or projection apparatus will produce soft focus effects of great beauty and under conditions of extreme rapidity of exposure. I know of no glass lens that is capable of producing similar results in any similar way.

In this production of soft focus effects, I take advantage of the wide range of rays transmitted by such a lens and the resulting light dispersion; or in other words, rays of different wave lengths in the beam are projected to correspondingly different foci. An uncorrected lens of quartz—particularly a lens of one unit only—because it does not bring light rays of different wave lengths to a focus at the same point, greatly increases the chromatic diffusion as compared with a lens made of glass. This produces a sufficiency of definition without blurring and with that amount of softness which permits of broad modeling, a result which can never be the product of microscopic definition.

Furthermore, quartz possesses the great advantage of transparency to the ultra-violet rays down to about 185 μμ, whereas most varieties of glass absorb in large degree that part of the spectrum of shorter wave length than the visible violet rays, about 390 μμ. These ultra-violet rays affect chemical reaction, particularly that produced by light on a photographic plate to a much greater extent than the rays of visible light, and, therefore, the quartz lens shows a great increase in rapidity as compared with a lens made of any of the optical glasses in common use. Comparative tests prove that this rapidity—(that is, the speed with which the photographic plate is reacted upon)—reaches five times that of glass lenses used for similar photographic purposes. Because rays of great intensity are transmitted which do not pass through glass at all, it is possible to get photographs in comparatively dull daylight—such as that from windows in an ordinary room or in deeply shaded woods or forests—with a rapidity of one-sixteenth of a second. I have taken good portraits by the artificial light of a single forty-watt Mazda electric lamp in ten seconds. The quartz lens is more rapid than a lens of any other material known to me, because it can be used at very wide aperture, and in addition to the volume of light thus obtained there is a further gain by reason of little loss from reflection—the number of surfaces being two against as many as sixteen in the case of some anastigmats, every surface turning back a certain proportion of the light.

I prefer to make the quartz lens by grinding the material to meniscus form, and I may use as the material fused quartz which can now be produced for optical purposes free from strain. As compared with a similar lens of glass, the quartz lens exhibits a marked difference in the variation of focus between the visible image and the actinic image recorded on the plate. In the case of the glass lens, this difference amounts to as much as one-fortieth of the focal length. In the case of the quartz lens it is only about one-four-hundredth of the focal length. This is insufficient to make any real difference in focusing necessary. The inconvenience and error avoided in making the exposure will be obvious. Finally, the quartz lens is much less expensive than a combination of glass lenses designed to produce similar pictorial effects.

In using the meniscus quartz lens in the camera, the convex surface should be turned toward the plate, the diaphragm should be well in advance of the lens, and a lens shade should be employed—especially if the lens is worked at full aperture.

I claim:

1. The method of producing photographic soft focus effects, which consists in interposing in the path of the light beam from the object to the sensitized surface, a lens of quartz of meniscus form for projecting to different foci rays of different wave lengths in said beam.

2. The method of producing photographic soft focus effects, which consists in interposing in the path of the light beam from the object to the sensitized surface, a lens of quartz for projecting to different foci rays of different wave lengths in said beam.

3. A photographic lens of quartz designed for producing photographic soft focus effects.

4. A photographic lens of quartz of meniscus form designed for producing photographic soft focus effects.

5. A soft focus meniscus photographic lens formed of quartz.

6. A soft focus meniscus photographic lens formed of fused quartz.

7. A soft focus meniscus photographic lens formed of synthetic quartz.

8. A soft focus photographic lens formed of fused quartz.

9. A soft focus photographic lens formed of synthetic quartz.

In testimony whereof I hereunto affix my signature.

HENRY D'ARCY POWER.